United States Patent Office 3,465,169
Patented Sept. 2, 1969

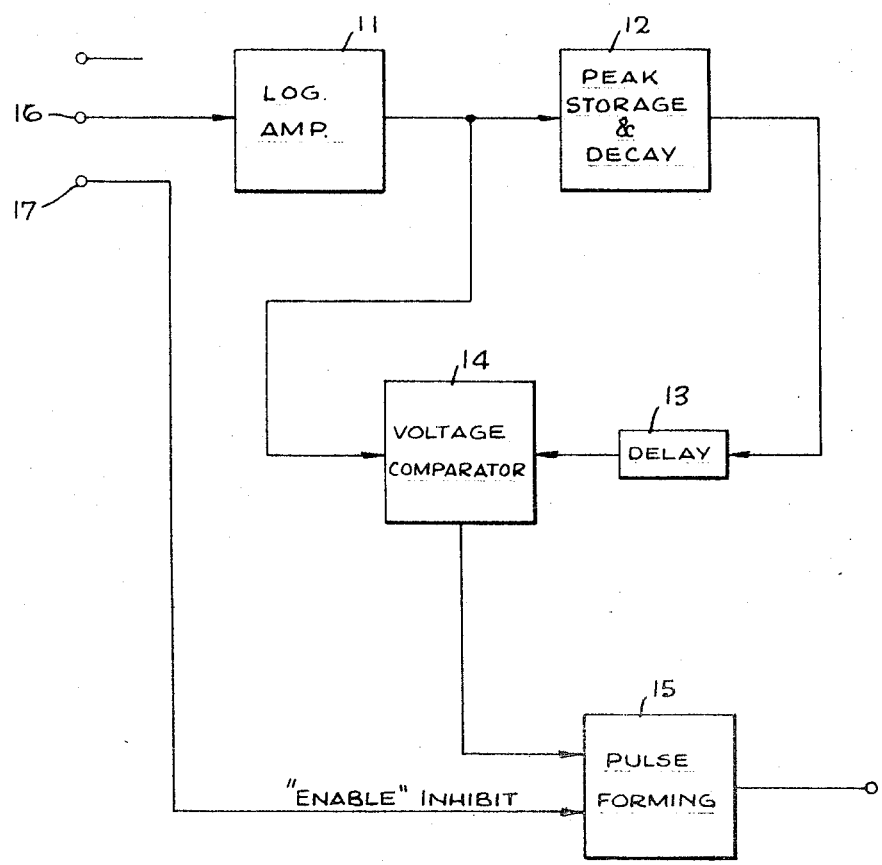

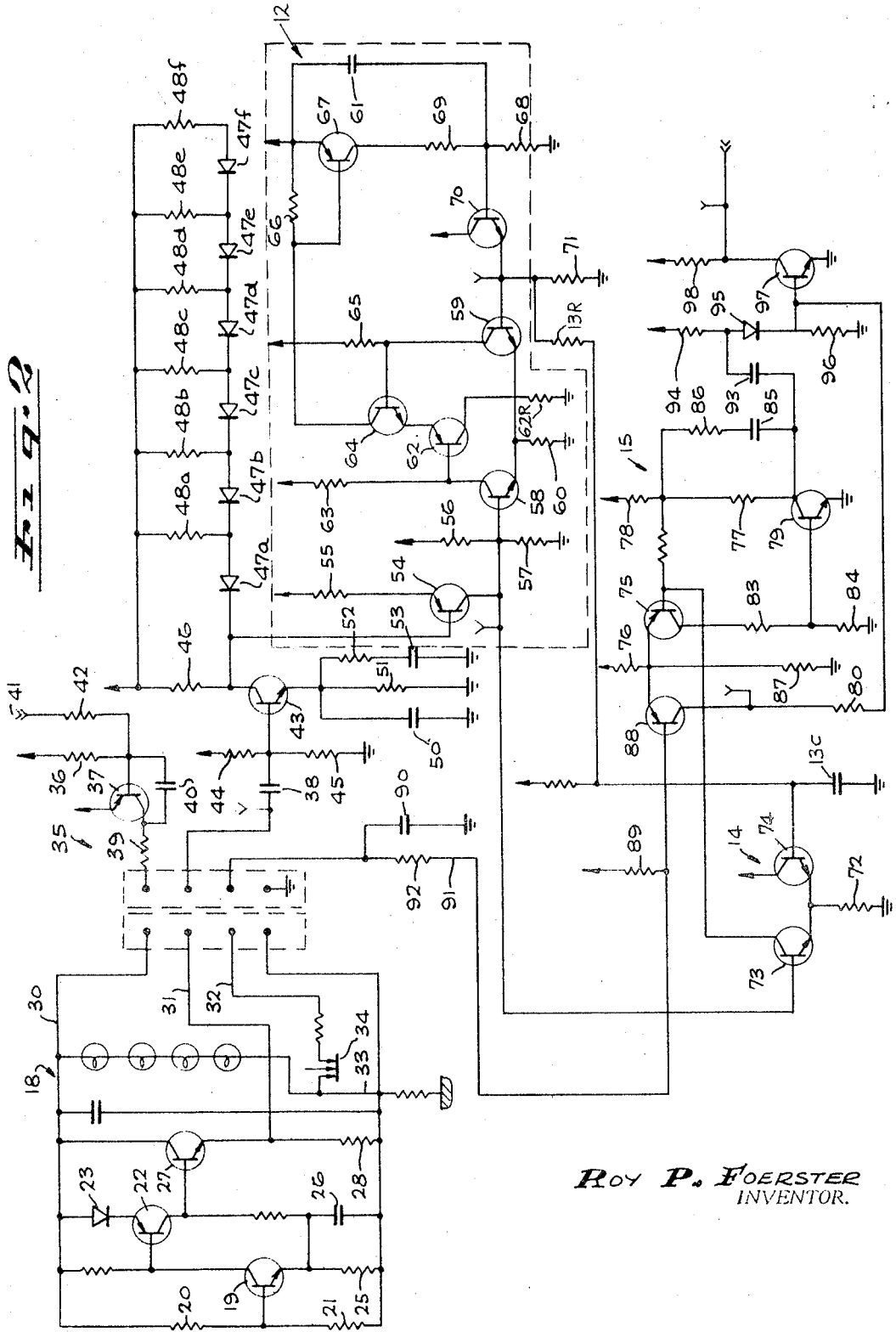

3,465,169
CIRCUIT APPARATUS FOR DETECTING RECURRING INPUT SIGNALS WITHIN A WIDE AMPLITUDE RANGE
Roy P. Foerster, Thousand Oaks, Calif., assignor to The Bunker-Ramo Corporation, Canoga Park, Calif., a corporation of Delaware
Filed Nov. 14, 1966, Ser. No. 594,105
Int. Cl. H03k 5/20
U.S. Cl. 307—235    5 Claims

ABSTRACT OF THE DISCLOSURE

Circuit apparatus for detecting recurring input signals within a wide amplitude range out of a noisy background. The circuit apparatus employs a logarithmic amplifier to compress the amplitude range of the input signals. A peak storage circuit stores the peak occurring in the output of the logarithmic amplifier. The stored peak is permitted to decay and is subsequently used as a variable threshold with which the following signal peak is compared. An output pulse circuit is triggered only when a new signal peak exceeds the established variable threshold.

---

The present invention relates to a signal processing circuit particularly useful for processing signals provided by light pens of the type disclosed in U.S. patent application Ser. No. 594,064, filed on Nov. 14, 1966, by Roy P. Foerster and assigned to the same assignee as the present application.

The term "light pen" is applied to a device that can be used in conjunction with a computer controlled cathode ray screen display. Such displays may be in the form of alphanumeric characters shown on predetermined locations of a cathode ray tube screen, or line drawings generated by the display unit in response to information stored in the computer storage. The image that constitutes the display is refreshed on the cathode ray tube screen at a rate such as 60 times per second in order to create the visual effect of a continuous display. As the cathode ray beam scans the screen in a predetermined time schedule, the time of appearance of a light impulse at a particular location can be related to the actual data (for example, being provided by a computer) which is being represented by the display at that location. Accordingly, by sensing the time of occurrence of a light impulse at a particular screen location, an operator can thus identify the corresponding data, which can then be modified.

More particularly, the light pen includes a light-sensitive detector and means for focusing a small area of the display surface onto that detector, and the pen, in conjunction with appropriate circuitry, is capable of generating a pulse in response to the transient light signal created by the beam sweeping past a particular screen location. This pulse may be utilized to initiate changes in the display. For instance, it may be desirable to simply wipe out certain portions of the display or a certain alphanumerical character may have to be replaced by another one.

The present application deals with a novel circuit for handling the light pen signal and for producing a uniform output signal indicative of the appearance of a transient light signal from the cathode ray beam in the field of view of the pen.

There are a number of circumstances that make the handling of the light pen signal rather difficult to perform. In the first place, the signal from the light pen varies widely because of varying intensities of the cathode ray trace, due inter alia to various speeds of the trace. The trace may be projected on a light background of widely varying luminosity because it is often desired to display an optically projected image on the screen phosphor. The optically projected image may be a map, whereas the computer generated display may indicate points of interest on that map, figures, and the like. The map presentations will contain areas of varying luminosity. The pen "sees" therefore a light track often varying in intensity by more than 40 db against a background that may also vary in intensity.

A further requirement that the light pen has to meet is that it should be easily operable and produce a signal within a very small delay. Ambient light, that may vary widely in intensity, is an additional complicating factor. Under all these varying circumstances, the light pen and the circuitry operating on the signal produced by it should preferably be operable without manual adjustments.

The aforecited patent application describes how it is possible to produce an electrical signal with a small delay even when using a phototransistor which, in the absence of the teachings of said application, would operate much slower. As described in that application, increased speed can be achieved by a direct current bias being placed upon the base of the phototransistor, which is normally held open, resulting in some direct current background in the signal.

The present invention deals more specifically with the problem of producing a uniform output signal regardless of the direct current background level and varying noise levels.

It is therefore an object of the present invention to provide a means for handling a recurrent signal of widely varying intensity in the presence of widely varying direct current background levels and noise.

More specifically, it is an object of the present invention to provide a signal handling device capable of use with a light pen which does not require manual adjustment for sensitivity or background variations.

According to the invention in its broader aspects, there is preferably provided a logarithmic amplifier. This compresses the original voltage range of the light pen signal, which may vary between limits as far apart as 0.1 volt and 10 volts to a smaller range, e.g., from 1 volt to 5 volts. A peak storage circuit then stores the peak occurring in the output of the logarithmic amplifier and uses the delayed peak as a variable threshold with which the following signal peak, due to a subsequent appearance of the light trace on the screen, is compared. Only when the recurring peak is larger than the threshold value is an impulse forming circuit triggered. The approach according to the invention provides a device that, without any manual adjustment, can operate upon a light pen signal widely varying in intensity and under extreme conditions of noise and background.

A preferred embodiment of the invention will now be described with reference to the accompanying drawings, in which:

FIGURE 1 is a block diagram of the circuit of the invention; and

FIG. 2 is a detailed circuit diagram.

FIG. 1 illustrates a logarithmic amplifier 11 that receives the signal produced by the light pen (not shown) at a terminal 16. The function of this logarithmic amplifier is to reduce the proportion between the highest and lowest occurring signals produced by the trace, so as to facilitate the handling at later stages.

The peak storage circuit 12 enables rapid charging of a capacitor substantially to the voltage peaks occurring in the output of the logarithmic amplifier. Between the recurring transient light pulses resulting in electric output pulses of the light pen, the stored peak voltage is allowed to decay slightly. This decayed voltage is used as the threshold or limit with which the next pulse is to be compared. Because the peak storage circuit operates very fast, it is necessary to delay the appearance of the stored peak until the next pulse appears. This function is performed by the delay circuit 13.

The voltage comparator 14 receives the output of the logarithmic amplifier 11 and the output of the delay circuit 13 as inputs. The output of the delay circuit being the variable threshold, the comparator 14 produces an output when the new pulse from the amplifier surpasses the signal level retained from the preceding peak. When this occurs, the pulse forming circuit 15 is triggered to produce a pulse that induces the desired action, such as erasing the information that is exhibited by the trace from a computer memory or substituting some other information therefor.

The appearance of the output pulse from circuit 15 is dependent upon the voltage on terminal 17, which is controlled by a manually operated "enable" button provided on the light pen (not shown).

In order to facilitate an understanding of the present invention, FIG. 2 includes a showing of the circuitry 18 of the light pen itself, which, in part, forms the subject matter of the aforecited patent application. This circuitry includes a phototransistor 19, preferably a silicon transistor, whose base-emitter junction is exposable to the light emitted by the trace. Response speed of the phototransistor is, according to the teachings of said application, enhanced by giving a slight forward direct current bias to the base. For this purpose, the junction of resistors 20 and 21, that are connected with their non-joined ends to B+ and ground terminals, respectively, is connected to the base. This causes the collector current, due to impingement of light, to appear against a direct current background, but, as the light signal is recurrent, the direct current signal background can be eliminated. The arrangement increases the speed of response of the phototransistor to recurrent light signals by about an order of magnitude.

A PNP transistor 22 is connected with its emitter to the cathode of a diode 23 to B+ and with its collector through a resistor to the parallel combination of a resistor 25 and a capacitor 26. The combination as described and shown produces a high gain for the recurrent signals and moderate gain for the direct current signals. The collector current of PNP transistor 22 is fed back to the emitter of phototransistor 19, reducing the loop gain for direct current levels. As capacitor 26 is a low impedance for the recurrent signal, the negative feedback reduces the gain for these signals to a lesser extent than for the background.

NPN transistor 27 is connected as an emitter follower having a resistor 28 connected between its emitter and ground. This provides a desirable low output impedance of the unit and eliminates the necessity of shielding the cable that connects the pen to the signal processing unit. This cable contains a lead 30 for B+, the signal carrying lead 31, and an enabling lead 32 that is connected to the ground lead 33 through a normally closed contact assembly operated (opened) by an enable push button 34.

B+ potential is switched on by an assembly 35 comprising a resistor 36, a PNP transistor 37, a resistor 39, a capacitor 40, a contact 41, and a resistor 42. The transistor 37 has its base connected to B+ through resistor 36 so that it is normally nonconducting. When the contact 41 connects the base to ground through resistor 42, the emitter collector path of transistor 37 is rendered conductive. This causes the capacitor 40 to charge, and the power supply in the light pen gradually assumes the end value. The purpose of this circuit is to avoid heavy transients that might otherwise occur.

The signal from the light pen is passed through capacitor 38 to the base of NPN transistor 43, which is biased by resistors 44 and 45 connecting respectively to the power supply and to ground. Transistor 43 is connected as an amplifier but has, instead of a resistive load, a network of diodes and resistors connected between the power supply B+ and its collector. At low voltages across the load, only resistor 46 carries a current, the voltage across the diodes then not being sufficient to render diode 47a conducting. At higher collector currents, diode 47a becomes conducting, which then causes resistor 48a to be in parallel with resistor 46. As the combined resistance of resistors 46 and 48a in parallel is lower than that of resistor 46 alone, the voltage gain is reduced at higher signal values. In the same way, resistors 48b, 48c, . . . 48f and diodes 47b, 47c, . . . 48f reduce the voltage gain at still higher input voltages.

It should thus be clear that as a consequence of the successive gain reductions as the output voltage increases, the transistor 43 provides the logarithmic amplification to compress the output voltage range of the light pen output signal as previously described. A circuit network comprised of three parallel branches is connected between the emitter of transistor 43 and ground to cause peaking of the output voltage of transistor 43 as it appears at the collector thereof. The three parallel branches respectively include capacitor 50, resistor 51, and resistor 52 connected in series with capacitor 53.

The output signal developed at the collector of transistor 43 is coupled through the peak storage and decay circuit 12 to the delay circuit 13. The peak storage and decay circuit 12 includes a PNP transistor 54 whose base is connected to the collector of transistor 43. The transistor 54 functions as an isolation buffer developing an output signal at its collector which is coupled to the base of transistor 58. Resistors 56 and 57 respectively couple the base of transistor 58 to B+ potential and ground. As a consequence, an increased magnitude input signal to the base of transistor 43 increases the emitter-collector current therethrough to increase the forward bias on transistor 54. The increased collector current through transistor 54 increases the drop across resistor 57 to raise the base potential of transistor 58.

Transistor 58, in combination with transistor 59, constitutes a differential amplifier. The emitters of transistors 58 and 59 are connected in common through resistor 60 to ground. The collectors of transistors 58 and 59 are respectively connected through resistors 63 and 65 to B+ potential.

As will be seen hereinafter, a decaying prior peak voltage is continuously supplied to the base of transistor 59 by capacitor 61. The differential amplifier functions to compare a new signal peak applied to the base of transistor 58 with the decaying prior peak available at the base of transistor 59. If the new peak exceeds the decaying prior peak, the voltage across the capacitor 61 is modified to raise the potential applied to the base of transistor 59 to the new peak.

More particularly, the collector of transistor 58 is connected to the base of PNP transistor 62 whose collector is connected through resistor 62R to ground. The emitter of transistor 62 is connected to the emitter of NPN transistor 64 whose base is connected to the collector of transistor 59. The collector of transistor 64 is connected through resistor 66 to the B+ supply. The emitter of PNP transistor 67 is connected to the B+ supply and the resistor 66 couples the emitter to the base. High valued resistor 68 and resistor 69 connect the collector of transistor 67 to ground. Capacitor 61 is connected between the emitter of transistor 67 and the junction between resistors 68 and 69. NPN transistor 70 is connected as an emitter follower and couples the junction between resistors 68 and 69 to the base of transistor 59. The collector of transistor 70 is connected to the B+ supply and the emitter is connected through resistor 71 to ground.

In the operation of the peak storage and decay circuit 12, an input signal to transistor 43 from the light pen will cause transistor 54 to conduct and thus raise the base potential of transistor 58. Assume that the new signal peak exceeds the decayed prior signal peak available at the base of transistor 59, thus causing transistor 58 to conduct. This will lower the potential on the base of transistor 62 thus causing conduction in the emitter-collector paths of transistors 62 and 64. The current thus conducted through resistor 66 supplies a forward biasing potential across the base-emitter junction of transistor 67 thus permitting the capacitor 61 to discharge therethrough. It should be appreciated that the magnitude of the forward biasing potential applied to transistor 67 is defined by the current pulled through resistor 66 which is in turn determined by the magnitude of the peak signal available at the collector of transistor 43. Thus, the greater the magnitude of the peak input signal applied to the base of transistor 43, the greater the forward biasing of transistor 67 and the greater the discharging of capacitor 61. The potential available at the junction between resistors 68 and 69 is determined by the charge across the capacitor 61; i.e., the potential at the junction will be equal to the B+ supply minus the potential across the capacitor 61. As the capacitor 61 discharges, the potential at the junction between resistors 68 and 69 rises. The potential at this junction is coupled by emitter follower transistor 70 to the base of transistor 59. When the potential on the base of transistor 59 exceeds that on the base of transistor 58, transistor 58 cuts off, thereby cutting off transistors 62, 64 and 67, thus terminating the discharging of capacitor 61 through the emitter-collector path of transistor 67 and thereby leaving the potential at the junction between resistors 68 and 69 equal to the just applied peak input signal. After the transistor 67 cuts off, the threshold or stored peak available at the junction between resistors 68 and 69 decays as a consequence of the voltage across capacitor 61 charging toward B+.

The decayed peak applied to the base of transistor 59 is also coupled through a delay circuit 13 to the voltage comparator 14. The delay circuit 13 comprised of resistor 13R and capacitor 13C, assures that the differential comparator 14 comprised of transistors 73 and 74 has the time to compare the instantaneous value of the new peak with the stored (and somewhat decreased) value of the preceding peak before the new peak is stored by capacitor 61. The circuit encompassing transistors 58, 62, 64 and 67 is so fast that in the absence of this delay produced by the delay circuit 13, the new peak would be compared against the stored value of the new peak instead of the value of the preceding peak, thereby causing the circuit operation to become erratic.

Differential comparator amplifier 14 comprises NPN transistors 73 and 74 having their emitters connected together and through a resistor 72 to ground. Transistor 73 receives at its base a signal from the junction of resistors 56 and 57 that is indicative of the instantaneous signal value from the light pen, modified by filtering. Transistor 74 receives at its base a signal that is indicative of the preceding peak decayed by the charging of capacitor 61 over the period since the last peak. As long as the peak value, or rather the value derived therefrom, is larger than the instantaneous value of the signal, the resulting conduction of transistor 74 and the voltage drop across resistor 72 caused thereby render transistor 73 nonconductive, and the condition of following circuits is solely determined by the preceding peak value as stored. However, if the signal from the light pen shows a new peak as it appears at the base of transistor 73, the latter becomes conductive (whereby transistor 74 becomes nonconductive), which constitutes the triggering signal to the following circuits, as will be presently described.

When the voltage at the junction of resistors 56 and 57 rises over the stored peak value, transistor 73 is rendered conductive, causing a lowering of the potential at the base of PNP transistor 75, which thus tends to become conductive. This renders the voltage at the junction of resistors 83 and 84, connected in series between the collector of transistor 75 and ground, more positive, which increases the conduction of an NPN transistor 79, which is connected with its base to this junction and with its emitter to ground. This, in turn, increases the voltage drop across resistor 78 connected in series with resistor 77 between the power supply and the collector of transistor 79. A series path comprised of capacitor 85 and resistor 86 is connected in parallel with resistor 77.

Accordingly, the voltage at the base of transistor 75 is lowered, which increases the conduction along its emitter-collector path. Accordingly, the relationship between the circuitry coupling the collector of transistor 79 to the base of transistor 75 is one of positive feedback causing each of the transistors to assume either an extreme of conductivity with the currents essentially limited by the loads in their emitter-collector paths or an extreme of nonconductivity.

The operation of the trigger circuit that includes transistors 75 and 79 is additionally controlled by a transistor 88 having its emitter connected to the emitter of transistor 75, and the potential on the enable line 91 connected to the base of transistor 75. When the latter is connected to ground by the contact 34 located in the light pen, transistor 75 is rendered conductive, making the triggering of the Schmitt trigger comprising transistors 75 and 79 to its opposite state virtually impossible. Only by breaking the ground connection of lead 91, which is done by operating the button on the pen, will the circuit operate as described. A capacitor 90 in connection with a resistor 92 in the line 91 by-passes spurious signal transients to ground.

The output signal from the complementary trigger circuit, or pulse forming circuit 15, comprising transistors 75 and 79, is taken at the collector of the latter and differentiated by a capacitor 93 connecting to the junction of a resistor 94 and the anode of diode 95, whose cathode is connected through resistor 96 to ground. This cathode is also connected to the base of NPN transistor 97, whose collector is connected to B+ through resistor 98. This conventional arrangement forms a suitable pulse from the positive going edge of the squared pulse produced by the trigger circuit. The pulse produced at the collector of transistor 97 initiates the further action desired from the operation of the light pen, such as erasure of certain portions of the programmed display or substitution of another display instead of the display indicated by the pen.

The foregoing clearly shows that an important feature of the described circuit is that it makes it possible to compare a peak voltage with a voltage that is derived from the somewhat reduced value of a preceding peak voltage obtained under a similar set of circumstances and to initiate action due to the occurrence of the peak with only a very small delay. The stored and, because of capacitor charging, slightly reduced peak voltage essentially serves as a variable threshold allowing it to operate the light pen without any manual adjustments under a wide variety of background and signal conditions. When the light pen is directed to a portion of the image with different background conditions, the threshold adjusts itself rapidly enough to the new circumstances to enable the desired operation of the circuit with a minimum of delay; that is, by the time the operator has manually directed the light pen to a new location and presses the enable button, the new threshold is already established. Therefore, the invention provides a circuit that allows an operator to use a light pen without having to pay attention to the luminosity of the display and the background and makes it possible to initiate action in a storage device with a minimum of delay after a particular section of this storage device causes a recurrent form of display, as observed by the light pen, to appear on a cathode ray screen.

Whereas in the foregoing several features of the invention have been explained and a preferred embodiment of the invention been shown and described in detail, it should be understood that the invention itself is deemed to be defined in and by the following claims.

The embodiments of the invention in which an exclusive property or privilege is claimed are defined as follows:

1. A circuit for processing a recurring transient signal produced by a light-sensitive device in response to recurrent light pulses in the presence of variable background light intensity, comprising:

amplifier means for producing, at an output thereof, a signal indicative of the signal produced by the light-sensitive device;

comparator means having first and second inputs and an output, said comparator means capable of producing an output signal at its output in response to the signal received at its first input being larger than the signal received at its second input, and the output of said amplifier means being connected to the first input of said comparator means;

storage means connected to the output of said amplifier means and capable of storing peak values of the signal produced by said amplifier means;

means for proportionally reducing the signal produced by said storage means during the period between one peak and another peak occurring immediately after said one peak; and delay means connected to said means for proportionally reducing the signal and operating on the signal produced thereby, said delay means producing a signal at the second input of said comparator means so as to allow the comparison of one peak occurring in the output signal of the amplifier means with the stored and proportionally reduced value of another peak preceding said one peak occurring in the output signal of said amplifier means.

2. The circuit as defined in claim 1 wherein said amplifier means is a logarithmic amplifier.

3. The circuit as defined in claim 1, additionally comprising a pulse forming circuit connected to the output of said comparator means.

4. A circuit for storing a voltage corresponding to a peak in a peaking signal comprising:

a capacitor connected between a first reference point and, through a resistor, to a second reference point;

a transistor having a base, emitter, and collector having its emitter-collector path connected across said capacitor;

a comparator circuit having first and second inputs and an output and capable of producing an output signal in response to a signal appearing on said first output surpassing the signal appearing on said second input;

means for receiving said peaking signal at said first input;

means for receiving the signal appearing at the junction between said capacitor and said resistor at said second input; and circuit means connected between the output of said comparator means and the base of said transistor so as to render said transistor conductive only upon the occurrence of the output signal of said comparator circuit, thereby allowing said capacitor to discharge in response to the voltage of the peaking signal being in excess of the voltage occuring at the junction of said resistor and said capacitor and allowing said capacitor to charge to the difference between the voltage at said first and second reference points through said resistor in response to the instantaneous value of the peaking signal voltage being lower than the voltage at said junction.

5. The circuit as defined in claim 4 wherein the time constant for charging the capacitor through said resistor is long in comparison to the time constant for discharging said capacitor through the emitter-collector path of said transistor.

References Cited

UNITED STATES PATENTS

| 2,493,648 | 1/1950 | Watton et al. | 328—115 X |
| 2,834,883 | 5/1958 | Lukoff | 328—135 X |
| 3,319,170 | 5/1967 | Harmer | 328—117 X |

JOHN S. HEYMAN, Primary Examiner

J. D. FREW, Assistant Examiner

U.S. Cl. X.R.

307—246, 238; 330—30